United States Patent [19]

Tambornino

[11] Patent Number: 5,755,452
[45] Date of Patent: May 26, 1998

[54] FOLDING HITCH SAFETY LATCH

[76] Inventor: Curt Tambornino, 6200 Highway 12, Eau Claire, Wis. 54701

[21] Appl. No.: 649,883

[22] Filed: May 13, 1996

[51] Int. Cl.$^6$ .......................................................... B60F 3/10

[52] U.S. Cl. ...................... 280/415.1; 280/417.1; 280/901

[58] Field of Search ............................ 280/415.1, 417.1, 280/441.2, 442, 433, 490.1, 491.3, 495, 500, 502, 507, 511

[56] References Cited

U.S. PATENT DOCUMENTS 5,435,585  7/1995  Chambers ........................... 280/415.1

*Primary Examiner*—Stephen Avila
*Attorney, Agent, or Firm*—Kinney & Lange, P.A.

[57] ABSTRACT

A folding ball hitch for use with fifth wheel trailers is movable between an operative position (protruding above a truck bed) and an inoperative position (stowed below the surface of the truck bed). A locking mechanism prevents the ball from inadvertent movement from the operative position to the inoperative position.

16 Claims, 4 Drawing Sheets

FOLDING HITCH SAFETY LATCH

BACKGROUND OF THE INVENTION

The present invention relates generally to a ball hitch adapted to releasably engage a coupling mechanism on a trailer, and more particularly to a folding ball hitch adapted to be mounted in the bed of a pickup truck for releasably engaging a socket coupling of a fifth wheel trailer.

Ball hitches are used in a wide variety of towing applications for towing many different kinds of trailers. Ball hitches may be mounted to vehicle bumpers and/or hitch drawbars, and in some applications mounted in the bed of a pickup truck. A ball hitch which is mounted in the bed of a pickup truck typically releasably engages a coupling socket of a fifth wheel trailer. Such ball hitch which is mounted in the bed of a pickup truck is usually located near the center of the truck bed so that the weight of the trailer is evenly distributed between the two sides of the truck. Because the ball hitch raises above the surface of the truck bed, use of the truck bed for other purposes, such as hauling various items, is impeded.

To overcome the problem of a ball hitch protruding from the center of a pickup truck bed, folding ball hitches were developed which allow the ball to be lowered into an inoperative position below the surface of the truck bed, thus allowing the truck bed to be used for other purposes when not towing a trailer. Because the folding ball hitch is movable between an operative position (protruding above the truck bed) and an inoperative position (stowed below the surface of the truck bed), a mechanism for maintaining the ball in the chosen position is required. In most folding ball hitches, a cover plate in the truck bed serves to cover the ball when it is in the inoperative position and also maintains the ball in its operative position when the ball hitch is in use. The cover plate prevents the ball from rotating from its operative position to its inoperative position, until the cover plate is moved out of the path of the ball. The cover plate is typically maintained in position by gravity and a variety of spring-driven systems.

Although the cover plate/spring systems generally work to maintain the ball in its operative position, such systems are not foolproof. Specifically, the spring or some other portion of the mechanism may break, come loose or weaken over time. In such instances, only the force of gravity prevents the cover plate from inadvertently moving out of the path of the ball. In such an instance, the ball is no longer positively secured, and is capable of shifting. During use, the hitch typically experiences a significant amount of bouncing and jarring, and the possibility of an unrestrained cover plate moving out of the path of the ball becomes very real. If the ball moves while towing a trailer, serious injury could result. Therefore, there exists a need for a more reliable and secure latching device for folding ball hitches. Specifically, a need exists for a safety latch to maintain the ball in its operative position until positively released by the operator.

SUMMARY OF THE INVENTION

The present invention is a folding ball hitch having a locking mechanism for maintaining the folding ball in an operative position and preventing inadvertent movement of the ball from the operative position. The folding ball hitch of the present invention includes a standard folding ball hitch having a frame secured beneath the surface of a truck bed, the ball selectively positionable in an operable position (protruding above the truck bed) and an inoperative position (stowed below the surface of the truck bed). A cover plate in the truck bed covers the ball when it is in the inoperative position and also maintains the ball in its operative position when the ball is in use. The frame of the folding ball hitch includes a cover plate which covers the ball when it is in the inoperative position.

The ball hitch of the present invention incorporates a locking mechanism for engaging the frame of the hitch and maintaining the ball in an operative position until the locking mechanism is positively disengaged by the user, thus preventing inadvertent movement of the ball out of the operative position. The folding ball hitch of the present invention thus has advantages over the prior art. Prior art folding ball hitches rely on gravity to maintain the cover plate in position and thus retain the ball in its operative position. In some instances, a spring forces used to help restrain the cover plate, and thus the ball, from moving. Cover plates relying on gravity or spring force to maintain their position are acceptable to inadvertent movement due to bouncing and jarring of the hitch, as well as broken or weakened springs. The present invention utilizes a positively engaging latch mechanism to restrain the cover plate; and thus the ball, until the user affirmatively disengages the latching mechanism. The folding ball hitch incorporating the latching mechanism of the present invention cannot be moved to its operative position without the locking mechanism being positively engaged.

DETAILED DESCRIPTION OF THE PREFERRED EMBODIMENTS

Figure 1A:
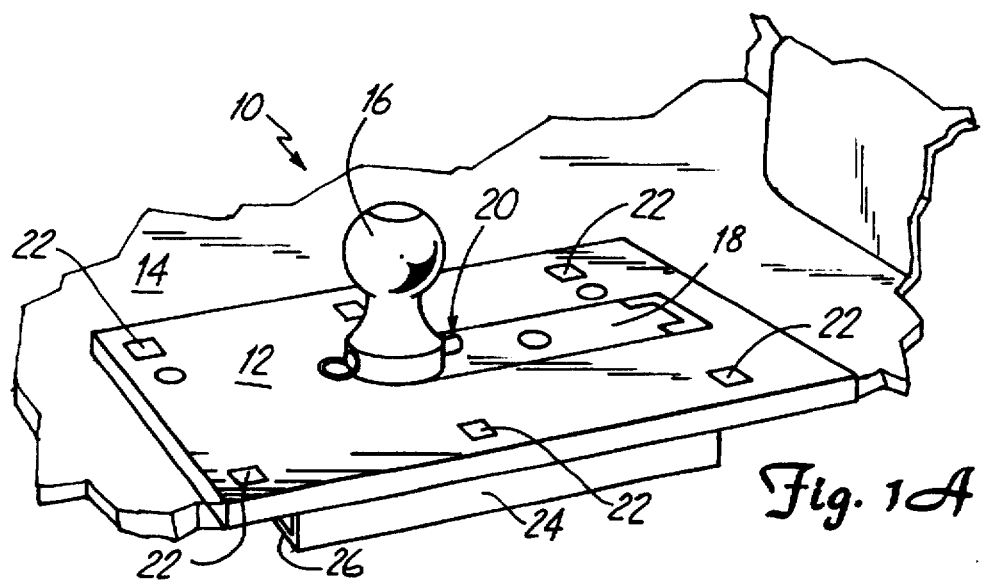
FIG. 1A is a perspective view of a folding ball hitch equipped with the new and improved safety latch of the present invention, with the ball in an operative position.

As seen in FIG. 1A, folding ball hitch 10 includes a mounting plate 12 which is adapted to be mounted in the bed 14 of a pickup truck or similar vehicle. The folding ball hitch 10 further includes a ball 16 which is adapted to releasably engage a coupling mechanism of a trailer (not shown), a cover plate 18, and a safety latch 20 which secures ball 16 in an operative position.

Folding ball hitch 10 is secured in bed 14 by bolts 22 which pass through mounting plate 12 and into the truck bed 14. Side frame plates 24 and bottom frame plate 26 are secured to the bottom of the mounting plate 12, such as by welding or other means known in the art. The side frame plates 24 and bottom frame plate 26, together with mounting plate 12, provide the structural framework of folding ball hitch 10.

Figure 1B:
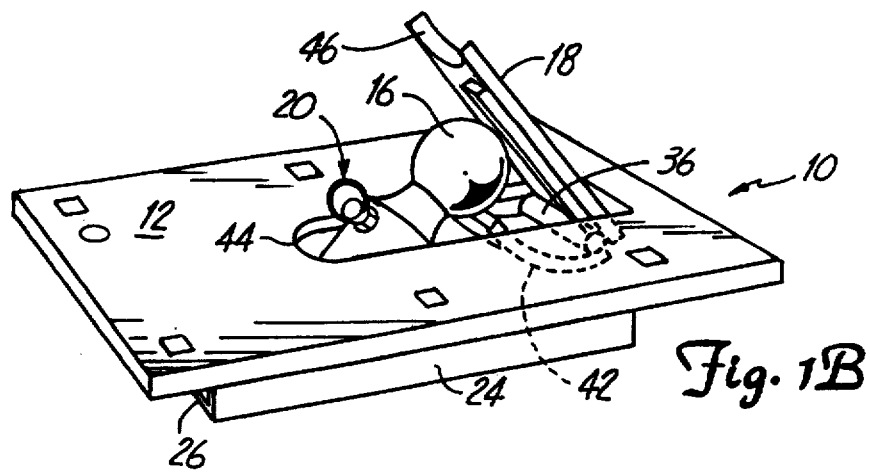
FIG. 1B is a perspective view of the folding ball hitch of FIG. 1A, with the ball being moved from an operative to an inoperative position.
Figure 1C:
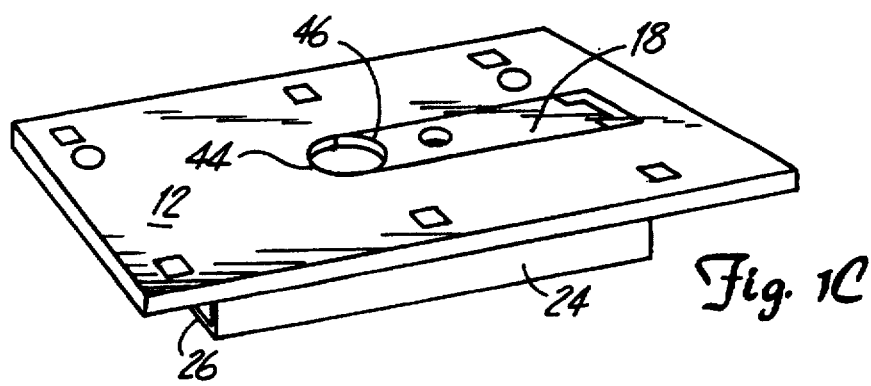
FIG. 1C is a perspective view of the folding ball hitch of FIG. 1A, with the ball in an inoperative position.

Ball 16 is selectively positionable in either an operative position for engagement with a trailer coupling mechanism, or in an inoperative positioned below cover plate 18 and truck bed 14. As seen in FIGS. 1A–1C and 2A–2C, ball 16 moves from an operative position (FIGS. 1A and 2A), through an intermediate position (FIGS. 1B and 2B) to an inoperative position (FIG. 1C and 2C).

Figure 2A:
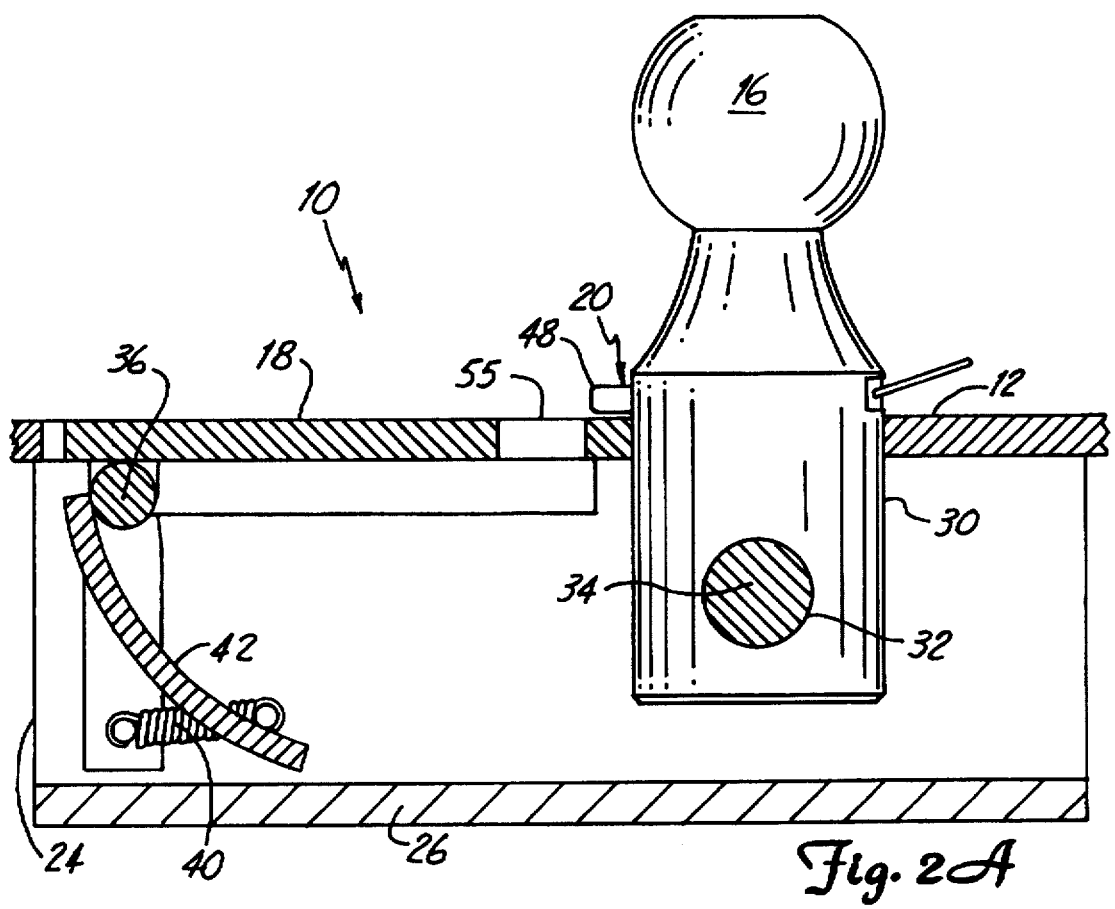
FIG. 2A is a partial cross-sectional view of a folding ball hitch equipped with the new and improved safety latch of the present invention, with the ball in an operative position.
Figure 2B:
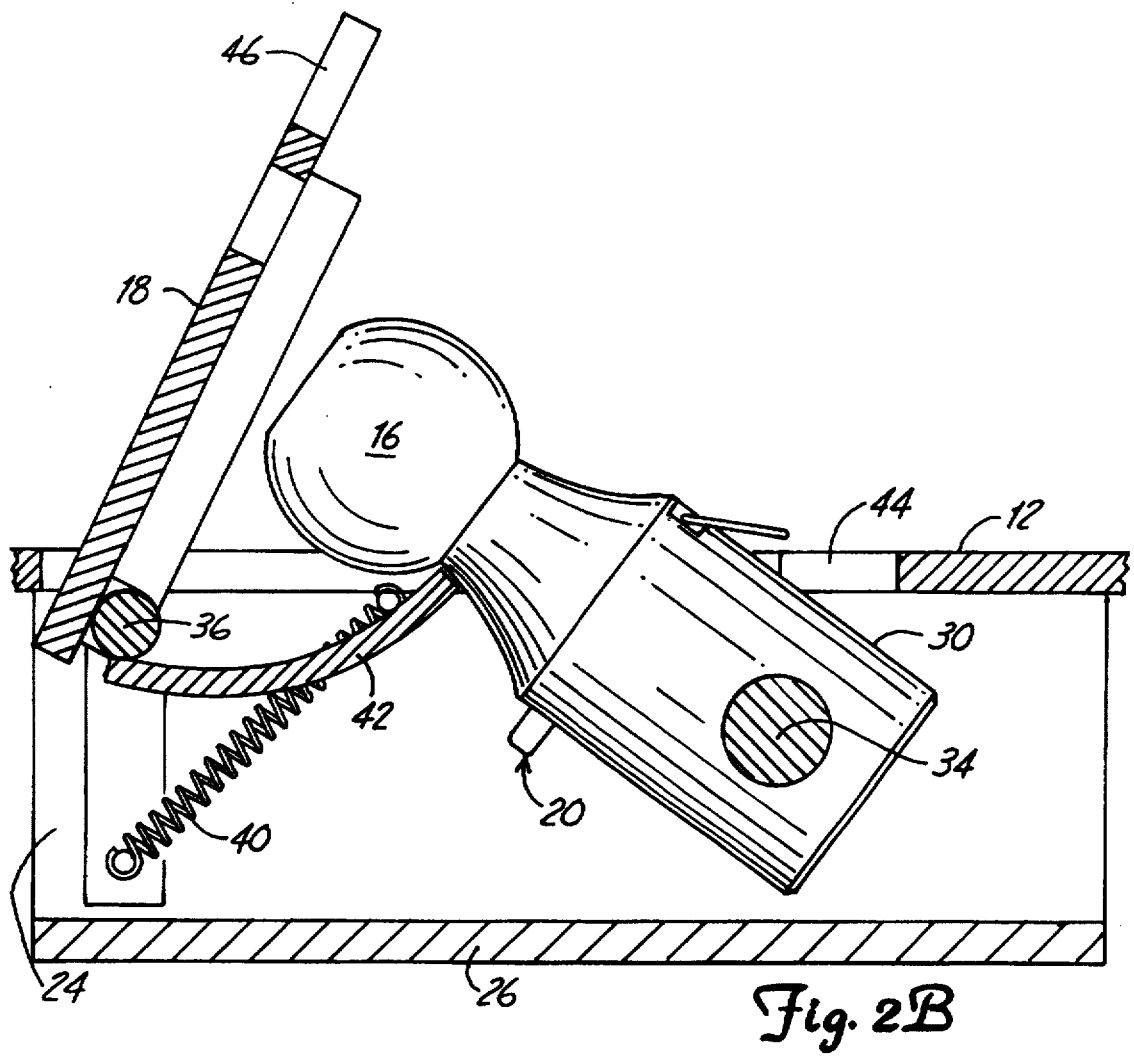
FIG. 2B is a partial cross-sectional view of the folding ball hitch of FIG. 2A, with the ball being moved from an operative position to an inoperative position.
Figure 2C:
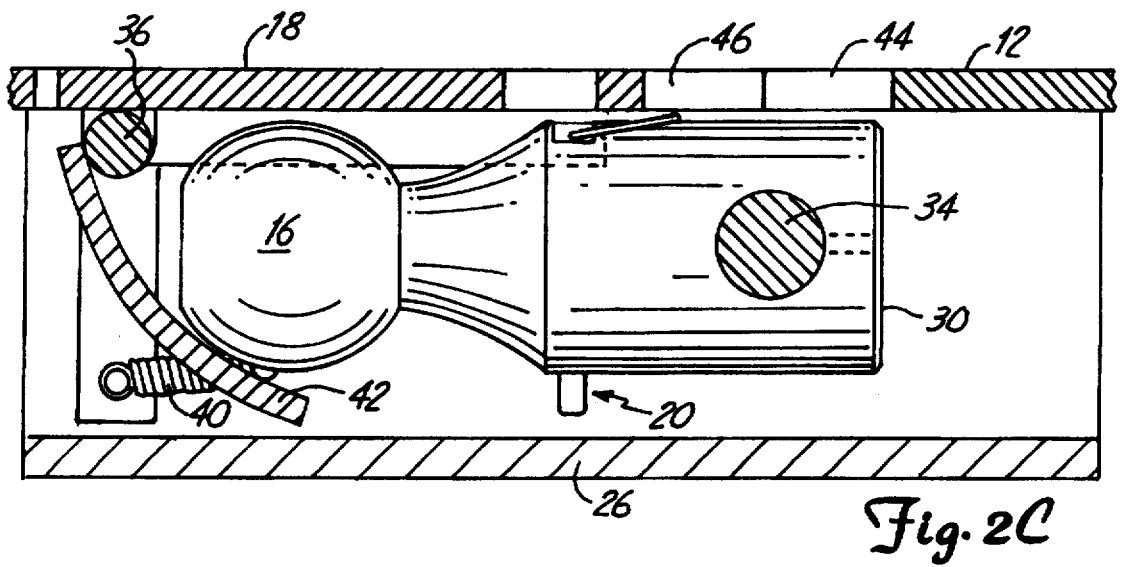
FIG. 2C is a partial cross-sectional view of the folding ball hitch of FIG. 2A with the ball in an inoperative position.
Figure 3:
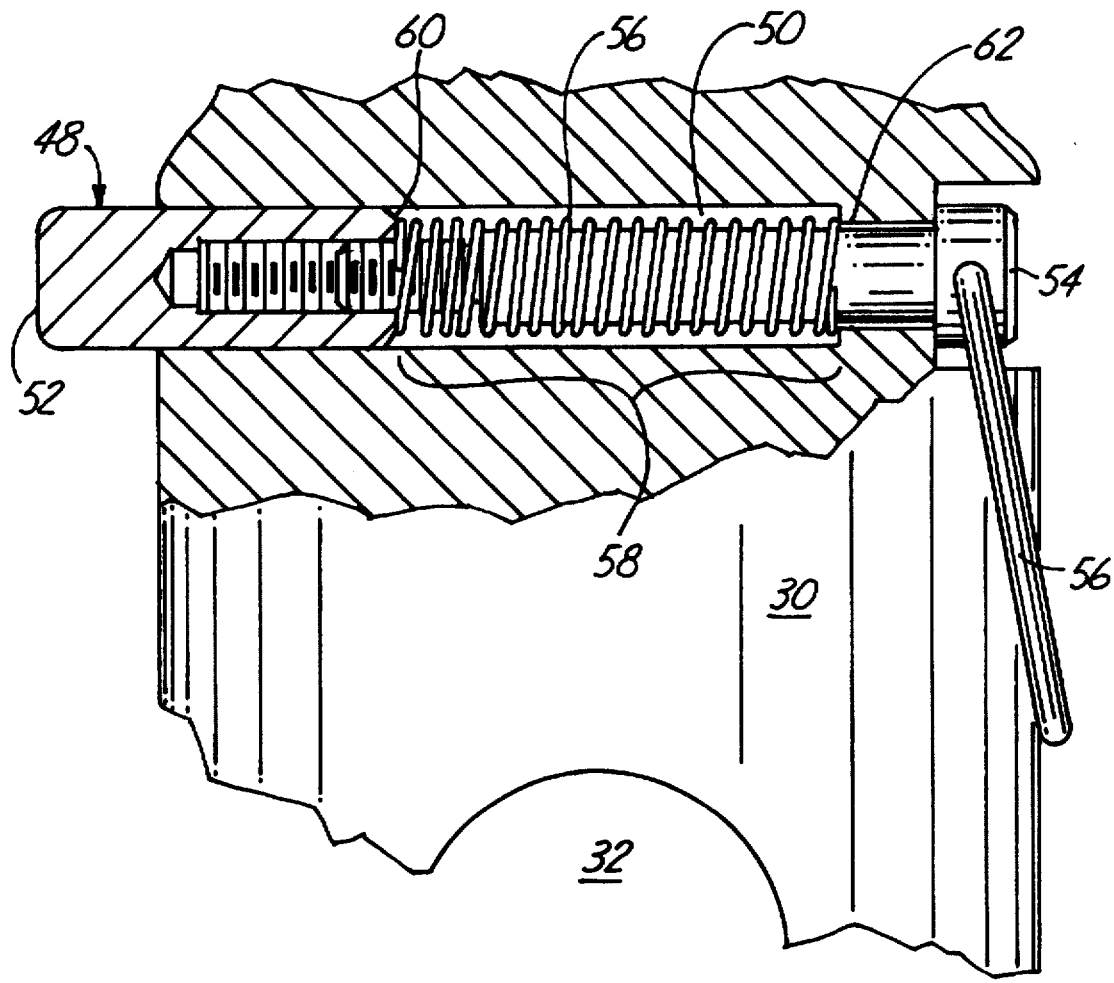
FIG. 3 is a partial section view of the safety latch of the present invention installed in a folding ball hitch.

As best seen in FIGS. 2A–2C, ball 16 is formed with an integral shank 30 which extends from ball 16. Shank 30 includes a bore 32 for receiving a pivot pin 34. Ball 16 and shank 30 are positioned between side frame plates 24 so that pivot pin 34 extends between side frame plates 24. Pivot pin 34 is secured to side frame plates 24 by welding or other means known in the art. Ball 16 is thus able to pivot about pivot pin 34 between the operative position (in which ball 16 extends above mounting plate 12) and an inoperative position (in which ball 16 is below mounting plate 12).

Cover plate 18 covers ball 16 when ball 16 is in an inoperative position, and helps maintain ball 16 in either an operative position or an inoperative position. To permit ball 16 to pivot between an operative position and an inoperative position, cover plate 18 is secured to pivot pin 36, and pivots about pivot pin 36 between a closed position (FIGS. 1A and 1C) and an open position as seen in FIG. 1B. The open position is a transitory position which removes cover plate 18 from the path of ball 16 and allows ball 16 to be pivoted between an inoperative position and a operative position (FIG. 1B). Cover plate 18 is in the closed position when ball 16 is in an operative position and also when ball 16 is in an inoperative position.

Cover plate 18 is biased towards the closed position by tension spring 40. One end of tension spring 40 is secured to side frame plate 24, while the opposite side of spring 40 is secured to lever arm 42, which is in turn rigidly secured to pivot pin 36 of cover plate 18. As cover plate 18 is pivoted from the closed position to the open position, pivot pin 36 and lever arm 42 rotate with cover plate 18. The rotation of lever arm 42 causes spring 40 to be stretched, and the tension in spring 40 resists movement of cover plate 18 toward the open position. As can be seen, tension spring 40 thus biases cover plate 18 toward the closed position.

As cover plate 18 is moved towards its open position, lever arm 42 also acts to raise ball 16 from the inoperative position toward the operative position. As seen in FIG. 2B, as lever arm 42 rotates as cover plate 18 is raised, lever arm 42 engages the underside of ball 16 (if ball 18 is in the inoperative position) and causes ball 16 to pivot toward the operative position. When ball 16 is sufficiently exposed above mounting plate 12, ball 16 can be gripped by the user and moved completely into the operative position. After ball 16 is in the operative position, cover plate 18 is drawn downward by the tension of spring 40 into the closed position. Shank 30 of ball 16 is then maintained in position between semi-circular opening 44 in mounting plate 12 and semi-circular opening 46 in cover plate 18.

To prevent cover plate 18 from inadvertently moving from the closed position to the open position, safety latch 20 is provided in shank 30 of ball 16. In the absence of safety latch 20, cover plate 18 may inadvertently move from the closed position to the open position, if for example, spring 40 or lever arm 42 were to break. If spring 40 or lever arm 42 breaks, it is possible that the bumping and jarring of hitch 10 and of ball 16 which occurs during use could cause cover plate 18 to inadvertently move toward an open position. In such an event, ball 16 would no longer be maintained in the operative position, and the safety of the user jeopardized.

In accordance with the present invention, and as seen in the Figures, ball 16 is provided with safety latch 20 to prevent cover plate 18 from inadvertently moving from the closed position to the open position and thereby allowing ball 16 to move. Safety latch 20 includes a latch pin 48 having a first end 52 and a second end 54. Latch pin 48 is slidable in a bore 50 which extends through shank 30 of ball 16. Latch pin 48 is movable between a first position in which first end 54 of latch pin 48 extends through bore 50 and over cover plate 18, and a second position in which the first end 54 of latch pin 48 does not extend over cover plate 18. As best seen in FIG. 2A, bore 50 is positioned such that when ball 16 is in the operative position and cover plate 18 is closed, latch pin 48 extends slightly over and above upper surface 55 of cover plate 18.

Latch pin 48 is biased toward the first position by compression spring 56. Latch pin 48 includes a reduced diameter portion 58, which is adapted to receive spring 56, such that spring 56 is positioned over reduced diameter portion 58 of latch pin 48. Spring 56 is then compressed between shoulder 60 of latch pin 48 and shoulder 62 of bore 50, such that spring 56 biases latch pin 48 toward the first position. Latch pin 48 and spring 56 are retained in bore 50 by shoulder 62, which is sized to permit only reduced diameter portion 58 to move past shoulder 62. First end 52 and second end 54 cannot move past shoulder 62. Thus, latch pin 48 must be positively moved from the first position, (and away from cover plate 18) by using pull ring 64 attached to second end 54, before cover plate 18 can be moved from the closed position to the open position. In this manner, cover plate 18 is prevented from inadvertently moving from the closed position to the open position, and ball 16 thereby prevented from moving out of the operative position in an unexpected manner.

Although the present invention has been described with reference to preferred embodiments, workers skilled in the art will recognize that changes may be made in form and detail without departing from the spirit and scope of the invention.

What is claimed is:

1. A hitch adapted to be mounted to a vehicle for releasably engaging a coupling mechanism secured to a trailer, the hitch comprising:

a frame secured to a vehicle, the frame having a mounting plate providing an upper surface and having an opening extending below the upper surface, the upper surface being substantially flat; and a ball for releasably engaging a coupling mechanism secured to a trailer, the ball pivotally mounted on the frame for movement between an operative position and an inoperative position, the ball extending above the upper surface when the ball is in the operative position, and the ball positioned below the upper surface when the ball is in the inoperative position, a locking mechanism positioned within the ball for engaging the frame and maintaining the ball in the operative position, the locking mechanism, when the ball is in the inoperative position, being entirely disposed below the upper surface so the upper surface of the frame provides a substantially flat upper surface of the hitch.

2. The hitch of claim 1, wherein the ball includes a spherical portion for engaging a coupling mechanism secured to a trailer, and a shank portion.

3. The hitch of claim 1, wherein the locking mechanism includes a locking pin slidable within a pin aperture extending through the ball.

4. The hitch of claim 3, wherein the locking pin is movable between a first pin position and a second pin position such that when the ball is in the operative position and the locking pin is in the first pin position, the locking pin engages the frame for preventing movement of the ball from the operative position.

5. The hitch of claim 4, wherein the locking pin is spring biased toward the first pin position.

6. The hitch of claim 1, wherein the frame further comprises a cover plate, the cover plate being movably mounted to the mounting plate for movement between a closed position wherein the cover plate provides a portion of the upper surface of the frame and an open position allowing movement of the ball between the operative position and the inoperative position, the cover plate in the closed position bearing against the ball in the operative position for holding the ball in the operative position, the cover plate in the closed position covering the ball when the ball is in the inoperative position, and wherein the locking mechanism releasably engages the cover plate to prevent movement of the cover plate out of the closed position when the ball is in the operative position.

7. The hitch of claim 1, wherein the locking mechanism releasably engages the upper surface of the mounting plate.

8. The hitch of claim 2, wherein the locking mechanism is disposed in the shank portion.

9. A hitch adapted to be mounted in a truck bed for releasable engaging a coupling mechanism of a fifth wheel goose neck trailer, the hitch comprising:
  a mounting plate secured to a bed of a truck, the mounting plate having an upper surface;
  a frame extending below the mounting plate;
  a ball pivotally mounted on the frame for movement between an operative position above the upper surface of the mounting plate, and an inoperative position below the upper surface of the mounting plate;
  a cover plate movably mounted to the mounting plate for movement between a closed position and an open position allowing movement of the ball between the operative position and the inoperative position, the cover plate in the closed position bearing against the ball in the operative position for holding the ball in the operative position, the cover plate in the closed position covering the ball when the ball is in the inoperative position, the cover plate having an upper surface; and
  a locking mechanism extending through the ball for maintaining the ball in an operative position, the locking mechanism releasably engaging the upper surface of the cover plate.

10. The hitch of claim 9, wherein the locking mechanism includes a locking pin slidable within a pin aperture through the ball.

11. The hitch of claim 10, wherein the locking pin is movable between a first position and a second position such that when the pin is in the first position and the ball is in the operative position, the locking pin releasably engages the upper surface of the cover plate and prevents movement of the cover plate from the closed position and thereby prevents movement of the ball from the operative position.

12. The hitch of claim 11, wherein the locking pin is spring biased toward the first position.

13. hitch of claim 9 wherein the ball includes a spherical portion for engaging a coupling mechanism secured to a trailer, and a shank portion.

14. The hitch of claim 13, wherein the locking mechanism is disposed in the shank portion.

15. The hitch of claim 8, wherein the upper surface of the mounting plate is substantially flat and wherein, when the ball is in the inoperative position, the locking mechanism is entirely disposed below the upper surface of the mounting plate so the upper surface of the mounting plate provides a substantially flat upper surface of the hitch.

16. A hitch adapted to be mounted to a vehicle for releasably engaging a coupling mechanism secured to a trailer, the hitch comprising:
  a frame secured to a vehicle, the frame providing an upper surface, the upper surface being substantially flat, the frame comprising:
    a mounting plate providing a first portion of the upper surface of the frame;
    a cover plate movably mounted with respect to the mounting plate for movement between an open position and a closed position wherein the cover plate provides a second portion of the upper surface of the frame;
  a ball for releasably engaging a coupling mechanism secured to a trailer, the ball pivotally mounted on the frame for movement between an operative position wherein the ball extends above the upper surface and an inoperative position wherein the ball is disposed beneath the cover plate, the ball comprising:
  a spherical portion;
  a shank portion extending from the spherical portion, and a locking mechanism positioned within the shank portion, the locking mechanism being entirely disposed below the upper surface when the ball is in the inoperative position so the upper surface of the frame provides a substantially flat upper surface of the hitch, the locking mechanism including a locking pin slidable within a pin aperture extending through the shank portion and movable between a first pin position and a second pin position such that, when the ball is in the operative position and the locking pin is in the first pin position, the locking pin engages the upper surface of the frame for preventing movement of the ball from the operative position, wherein the locking pin is spring biased toward the first pin position;
  wherein the cover plate in the closed position bears against the ball in the operative position for holding the ball in the operative position, the cover plate in the closed position covering the ball when the ball is in the inoperative position, and wherein the locking mechanism releasably engages the cover plate to prevent movement of the cover plate out of the closed position when the ball is in the operative position.

* * * * *

UNITED STATES PATENT AND TRADEMARK OFFICE
CERTIFICATE OF CORRECTION

PATENT NO. : 5,755,452
DATED : MAY 26, 1998
INVENTOR(S) : CURT TAMBORNINO

It is certified that error appears in the above-indentified patent and that said Letters Patent is hereby corrected as shown below:

On the Title Page of the Patent under U.S. PATENT DOCUMENTS, insert the following references
--3,385,611  5/1968    Silver................280/511
  4,256,324  3/1981    Hamilton............280/491.3
  4,570,966  2/1986    Giboney et al.......280/491.3--

FOREIGN PATENT DOCUMENTS insert
--1,504,643  3/1978    Great Britain  280/491.3--

Signed and Sealed this

Third Day of November, 1998

Attest:

Attesting Officer

BRUCE LEHMAN

Commissioner of Patents and Trademarks